United States Patent [19]
Kelley et al.

[11] Patent Number: 6,081,863
[45] Date of Patent: Jun. 27, 2000

[54] METHOD AND SYSTEM FOR SUPPORTING MULTIPLE PERIPHERAL COMPONENT INTERCONNECT PCI BUSES BY A SINGLE PCI HOST BRIDGE WITHIN A COMPUTER SYSTEM

[75] Inventors: Richard Allen Kelley, Apex, N.C.; Danny Marvin Neal, Round Rock; Steven Mark Thurber, Austin, both of Tex.

[73] Assignee: International Business Machines Corporation, Armonk, N.Y.

[21] Appl. No.: 09/042,101

[22] Filed: Mar. 13, 1998

[51] Int. Cl.[7] ................................................ G06F 13/00
[52] U.S. Cl. .................................... 710/129; 710/131
[58] Field of Search .................................... 710/101, 128, 710/129, 131

[56] References Cited

U.S. PATENT DOCUMENTS

| | | | |
|---|---|---|---|
| 5,509,127 | 4/1996 | Datwyler et al. | 710/128 |
| 5,734,850 | 3/1998 | Kenny et al. | 710/129 |
| 5,751,975 | 5/1998 | Gillespie et al. | 710/126 |
| 5,799,207 | 8/1998 | Wang et al. | 710/38 |
| 5,819,052 | 10/1998 | Sonoda | 710/113 |
| 5,857,081 | 1/1999 | Furuta | 395/308 |
| 5,859,988 | 1/1999 | Ajanovic et al. | 395/309 |
| 5,887,144 | 3/1999 | Guthrie et al. | 710/101 |
| 5,890,015 | 3/1999 | Garney et al. | 710/62 |

FOREIGN PATENT DOCUMENTS

| | | |
|---|---|---|
| 55-97625 | 7/1980 | Japan . |
| 57-187726 | 11/1982 | Japan . |
| 1-106255 | 4/1989 | Japan . |
| 2-15356 | 1/1990 | Japan . |
| 3-14156 | 1/1991 | Japan . |
| 07084940 | 3/1995 | Japan . |
| 10198631 | 7/1998 | Japan . |

*Primary Examiner*—Ayaz R. Sheikh
*Assistant Examiner*—David A. Wiley
*Attorney, Agent, or Firm*—Volel Emile; Felsman, Bradley, Vaden, Gunter & Dillon, LLP

[57] ABSTRACT

A method and system for supporting multiple Peripheral Component Interconnect (PCI) local buses through a single PCI host bridge having multiple PCI interfaces within a data-processing system are disclosed. In accordance with the method and system of the present invention, a processor and a system memory are connected to a system bus. First and second PCI local buses are connected to the system bus through a PCI host bridge. The first and second PCI local buses have sets of in-line electronic switches, dividing the PCI local buses into PCI local bus segments supporting a plurality of PCI peripheral component slots. The sets of in-line electronic switches are open and closed in accordance with bus control logic within the PCI host bridge allowing up to fourteen PCI peripheral component slots to have access through a single PCI host bridge to the system bus.

20 Claims, 3 Drawing Sheets

METHOD AND SYSTEM FOR SUPPORTING MULTIPLE PERIPHERAL COMPONENT INTERCONNECT PCI BUSES BY A SINGLE PCI HOST BRIDGE WITHIN A COMPUTER SYSTEM

BACKGROUND OF THE INVENTION

1. Technical Field

The present invention relates in general to a method and system for data processing and, in particular, to a method and system for handling multiple Peripheral Component Interconnect (PCI) local bus accesses within a computer system. Still more particularly, the present invention relates to a method and system for handling multiple PCI local buses across a single PCI host bridge within a computer system.

2. Description of the Related Art

A computer system typically includes several types of buses, such as a system bus, local buses, and peripheral buses. Various electronic circuit devices and components are connected with each other via these buses such that intercommunication may be possible among all of these devices and components.

In general, a central processing unit (CPU) is attached to a system bus, over which the CPU communicates directly with a system memory that is also attached to the system bus. In addition, a local bus may be used for connecting certain highly integrated peripheral components rather than the slower standard expansion bus. One such local bus is known as the Peripheral Component Interconnect (PCI) bus. Under the PCI local bus standard, peripheral components can directly connect to a PCI local bus without the need for glue logic, the "profusion of chips needed to match the signals between different integrated circuits." Thus, PCI provides a bus standard on which high-performance peripheral devices, such as graphics devices and hard disk drives, can be coupled to the CPU, thereby permitting these high-performance peripheral devices to avoid the general access latency and the bandwidth constraints that are associated with an expansion bus. An expansion bus such as an Industry Standard Architecture (ISA) bus, is for connecting various peripheral devices to the computer system. These peripheral devices typically include input/output (I/O) devices such as a keyboard, floppy drives, and printers.

Additionally, under the PCI local bus standard for 33 MHz operation, only four peripheral component connector slots may be attached to the PCI bus due to loading constraints on the bus. In order to overcome this technical constraint, designers may add a second or more PCI local buses that give the end user of a computer system the advantage of adding on four more slots per bus. However, a PCI host bridge is required for transferring information from the PCI bus to the system bus. Therefore, with the addition of more than one PCI local buses, designers have had to add on multiple PCI host bridges and/or PCI-to-PCI bridges for supporting the multiple PCI buses thereby increasing the cost and complexity of the system.

Therefore, it is desirable in a PCI-based system requiring multiple PCI host bridges and/or PCI-to-PCI bridges supporting multiple PCI buses, that a single PCI host bridge support the multiple PCI buses thus minimizing the number of required bridges. Furthermore, it is desirable to have a single PCI host bridge operating at 33 MHz that has the capability of supporting more than four peripheral component slots. The subject invention herein solves all these problems in a new and unique manner which has not been part of the art previously.

SUMMARY OF THE INVENTION

In view of the foregoing, it is therefore an object of the present invention to provide an improved method and system for data processing.

It is another object of the present invention to provide an improved method and system for handling multiple PCI local buses per PCI host bridge within a data-processing system.

It is yet another object of the present invention to provide an improved method and system for supporting more than four PCI peripheral component slots per each PCI bus operating at 33 MHz within a data-processing system.

In accordance with the method and system of the present invention, a processor and a system memory are connected to a system bus. A plurality of PCI local buses are connected to the system bus through a PCI host bridge. The plurality of PCI local buses have sets of in-line electronic switches, dividing each PCI local bus into PCI local bus segments supporting a plurality of PCI peripheral component slots. The in-line electronic switches are open and closed in accordance with bus control logic within the PCI host bridge allowing up to eight PCI peripheral component slots per PCI bus to have access through the PCI host bridge to the system bus operating at 33 MHz.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention may be applicable in a variety of computers under a number of different operating systems. The computer may be, for example, a personal computer, a mini-computer, or a mainframe computer. For the purpose of illustration, a preferred embodiment of the present invention, as described below, is implemented on a mini-computer, such as the RS/6000 (series manufactured by International Business Machines Corporation).

Figure 1:
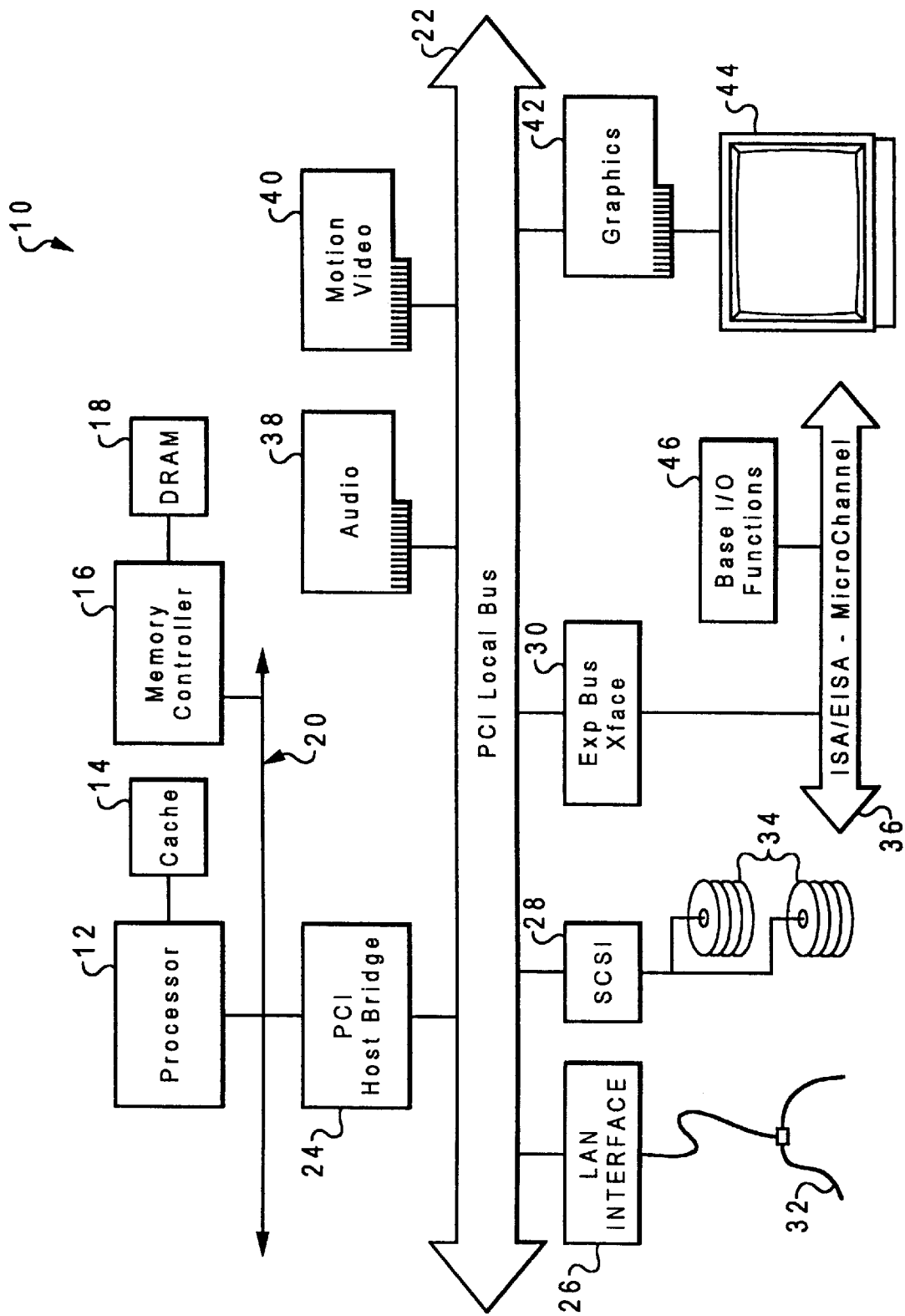
FIG. 1 is a block diagram of a typical computer system having a PCI local bus architecture, which may utilize a preferred embodiment of the present invention.

Referring now to the drawings wherein like reference numerals refer to like and corresponding parts throughout, and in particular to FIG. 1, there is depicted a block diagram of a typical computer system 10 having a PCI local bus architecture, which may utilize a preferred embodiment of the present invention. As shown in FIG. 1, a processor 12, cache memory 14, memory controller 16, and a Dynamic Random Access Memory (DRAM) 18 are all connected to a system bus 20 of a computer system 10. Processor 12, cache memory 14, memory controller 16, and DRAM 18 are also coupled to a PCI local bus 22 of computer system 10 through a PCI host bridge 24. PCI host bridge 24 provides a low latency path through which processor 12 may directly access PCI devices mapped anywhere within bus memory and/or I/O address spaces. PCI host bridge 24 also provides a high bandwidth path for allowing a PCI device to directly access DRAM 18. By way of example, but not of limitation, the PCI host bridge 24 may include various functions such as data buffering/posting and arbitration.

Referring once again to FIG. 1, also attaching to PCI local bus 22 may be other devices such as a local-area network (LAN) interface 26, a small computer system interface (SCSI) 28 and an expansion bus interface 30. LAN interface 26 is for connecting computer system 10 to a local-area network 32 such as to an Ethernet or Token-Ring. SCSI interface 28 is utilized to control high-speed SCSI disk drives 34. Expansion bus interface 30 couples any other expansion buses 36 such as an ISA bus, EISA bus, and/or MicroChannel Architecture (MCA) bus to the PCI local bus 22. Typically, various peripheral devices for performing certain basic I/O functions 46 are attached to one of expansion buses 36.

In general, PCI local bus 22 due to loading effects on the bus supports up to four add-in board connectors without requiring any expansion capability, such as adding a second PCI local bus not shown. Audio adapter board 38, motions video adapter board 40, and graphics adapter board 42 connected to a monitor 44 are examples of some devices that may be attached to PCI local bus 22 via add-in board connectors as shown in FIG. 1.

Figure 2:
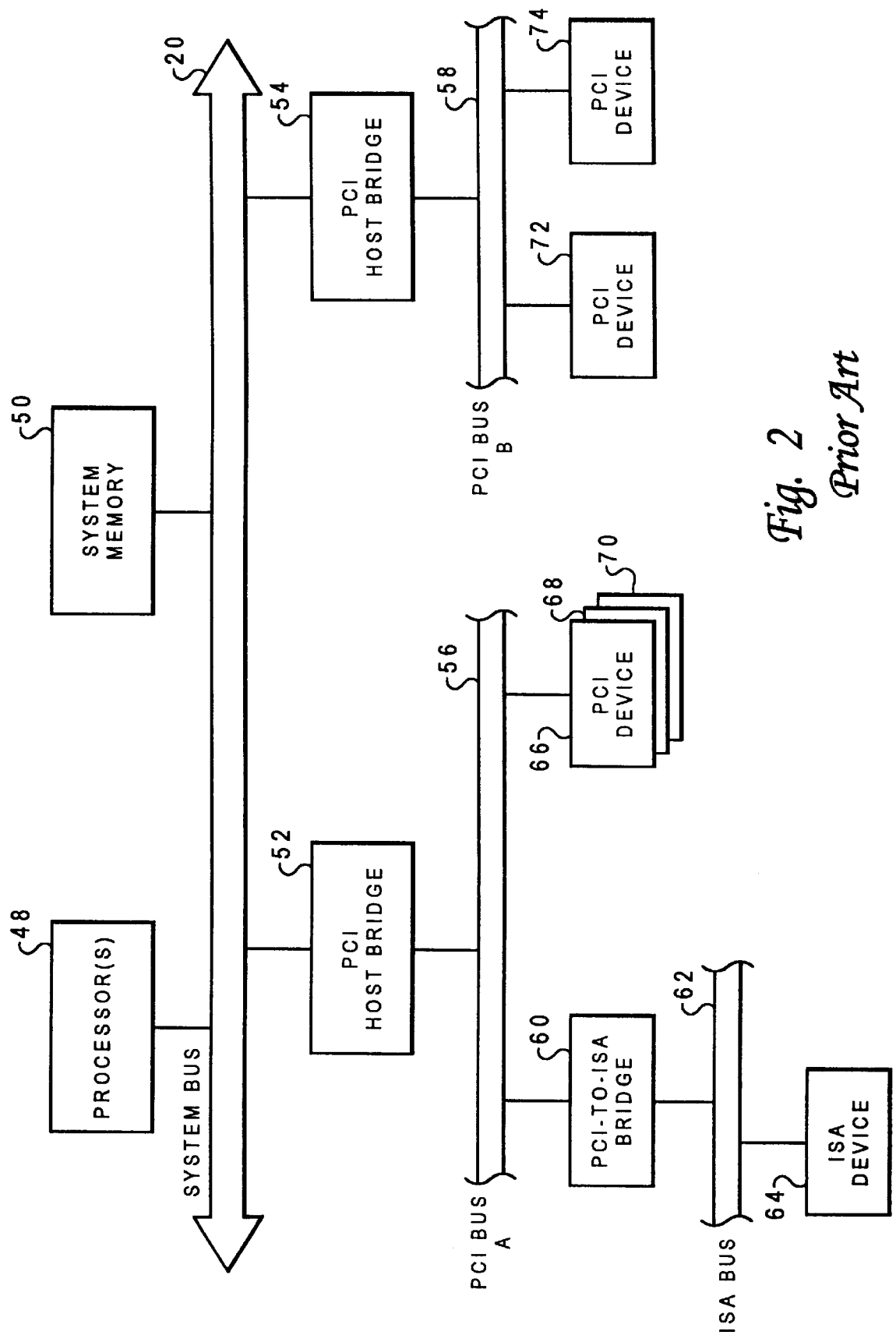
FIG. 2 is a block diagram of a prior art configuration having separate PCI local buses under separate PCI host bridges.

With reference now to FIG. 2, there is illustrated a prior art configuration having separate PCI local buses under separate PCI host bridges. As shown, processor(s) 48 and a system memory 50 are coupled for communication over a system bus 20. By way of example but, not of limitation, system bus 20 provides a 32-bit memory address space and a 16-bit I/O address space. A PCI host bridge 52 enables communications between bus agents coupled to system bus 20 and bus agents coupled to a PCI local bus A 56. Further, a PCI-to-ISA bridge 60 enables communications between bus agents (ISA device 64) coupled to an ISA bus 62 (ISA bus 62 is an expansion bus) and system memory 50. PCI-to-ISA bridge 60 also enables communications between processor(s) 48 and bus agents (ISA device 64) coupled to the ISA bus 62.

Referring once again to FIG. 2, PCI devices 66, 68 and 70 are bus agents coupled for communication over PCI local bus A 56. In addition, PCI host bridge 52 and PCI-to-ISA bridge 60 are coupled as bus agents for communication over PCI local bus 56. PCI host bridge 52 and PCI-to-ISA bridge 60 have the capability to be initiators and targets for access cycles over PCI local bus 56. Turning once again to FIG. 2, in addition to PCI host bridge 52, a second PCI host bridge 54 is also attached to system bus 20. Similar to PCI host bridge 52, PCI host bridge 54 enables communications between bus agents coupled to system bus 20 and bus agents coupled to a second PCI local bus B 58. Attaching to PCI local bus B 58 are PCI devices, such as PCI device 72 and PCI device 74.

Figure 3:
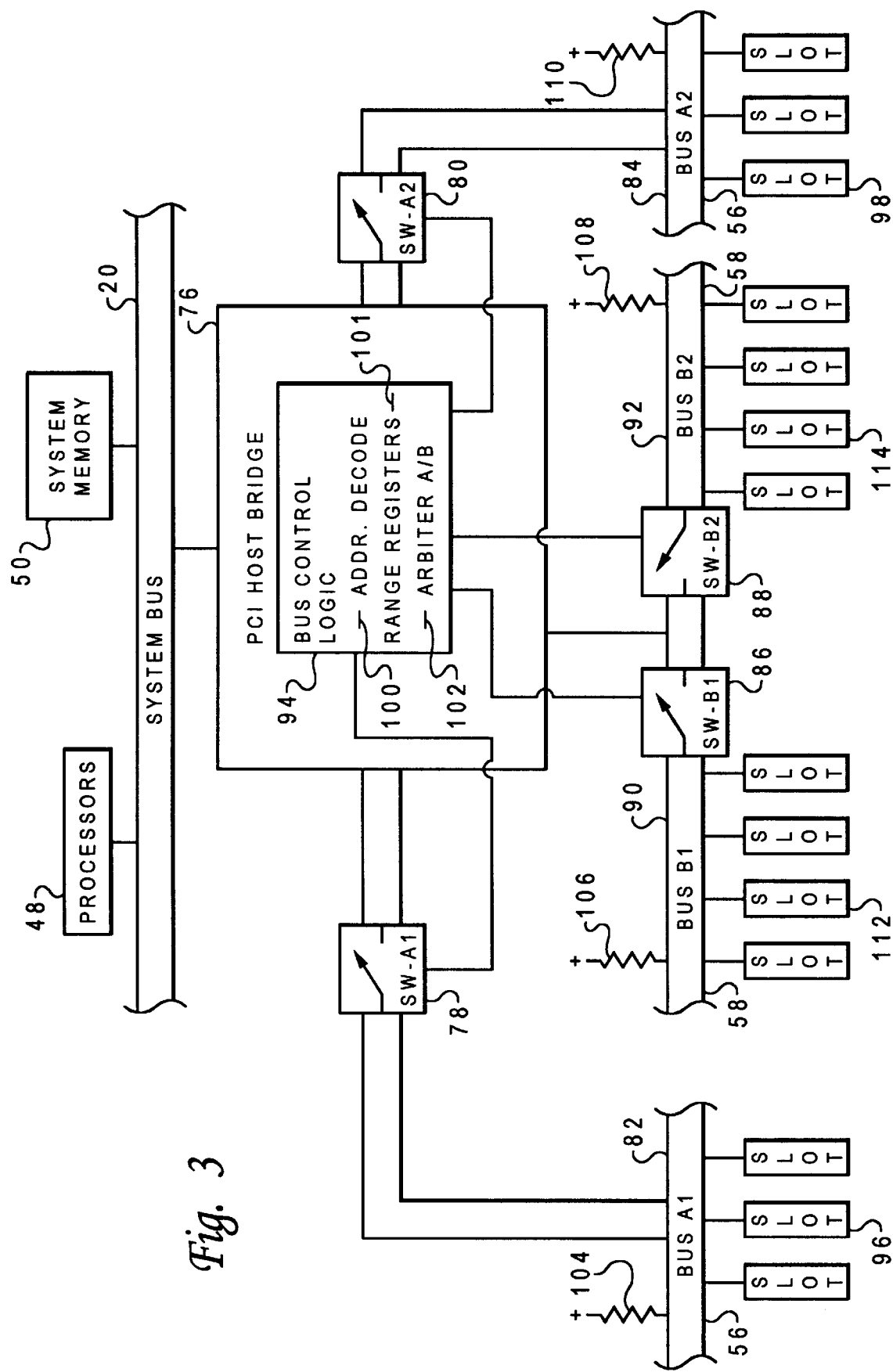
FIG. 3 is a block diagram of a PCI host bridge having separate PCI local buses in accordance with a preferred embodiment of the present invention.

Referring now to FIG. 3, there is illustrated a block diagram of a PCI host bridge 76 in accordance with the preferred embodiment of the present invention. As shown, PCI host bridge 76 may support a plurality of PCI local buses, namely, PCI local bus A 56 and PCI local bus B 58.

As shown in FIG. 3, two sets of in-line electronic switches are provided for each PCI bus thereby providing bus segments for allowing more than four PCI devices to be utilized on a given bus. These sets of in-line electronic switches additionally provide the total switching mechanism for all of the appropriate PCI signals associated with PCI buses for isolation on the buses as will be more fully described below.

Referring once again to FIG. 3, two sets of in-line electronic switches SW-B1 86 and SW-B2 88 are inserted along PCI local bus B 58 creating PCI local bus segments B1 90 and B2 92, respectively. In accordance with the PCI specification, the bus loading design requirements for the PCI local bus B 58 are normally ten loads for a maximum frequency of up to 33 MHz at 33 MHz of operation. Attaching a PCI slot to the PCI bus B 58 presents itself as two loads. As shown in FIG. 3, local bus segments B1 90 and B2 92, respectively, each have attached four peripheral component slots 112 and 114 for a total of eight loads on each bus segment. The host bridge 76 adds one load and open switches on the other bus segment, PCI local bus A 56, as will be more fully described below, add one more additional load, for a total of ten loads on each local bus segment B1 90 and B2 92, respectively.

As shown in FIG. 3, the PCI local bus segments B1 90 and B2 92 each support four PCI peripheral component slots 112 and 114 (add-in board connectors) for receiving PCI devices, not shown. It should be understood that in order to meet the ten load requirement that at any one time only one set of switches may be closed on PCI local bus B 58 producing a total of ten loads. Therefore, the opening and closing of switches SW-B1 86 and SW-B2 88 effectively isolate the PCI local bus B 58 from the local effects of the segments and the four added peripheral component slots behind the open switches allows eight slots to be utilized on PCI local bus B 58, thereby eliminating the need for the second PCI host bridge 54 shown in FIG. 2.

Turning once again to FIG. 3, two sets of in-line-electronic switches SW-A1 78 and SW-A2 80 are inserted along PCI local bus A 56 creating PCI local bus segments A1 82 and A2 84, respectively. As noted above, the bus loading design requirements for the PCI local bus A 56 are normally ten loads for a maximum frequency of up to 33 MHz at 33 MHz of operation. Once again, attaching a PCI slot to the PCI bus A 56 presents itself as two loads. As shown in FIG. 3, local bus segments A1 82 and A2 84 respectively, each have attached three peripheral component slots 96 and 98 for a total of six loads on each bus. The host bridge 76 adds one load and open switches SW-B1 86 and SW-B2 88 on PCI local bus B 58 add one more additional load, for a total of eight loads on each PCI local bus segments A1 82 and A2 84, respectively. As discussed above, open switches SW-A1 78 and SW-A2 80 adds an additional load on PCI local bus B 58. The three peripheral component slots 96 and 98 on each side of PCI local bus segments A1 82 and A2 84 when either switch SW-A1 78 and SW-A2 80 is closed presents six loads and is restricted to one less slot on each bus segment to allow for the added trace length of wire that may be required pass the slots in PCI local bus B 58 (which adds an approximately equivalent additional load to that bus segment).

As shown in FIG. 3, the PCI local bus segments A1 82 and A2 84 each support three PCI peripheral component slots 96 and 98 (add-in board connectors) for receiving PCI devices, not shown, while accounting for the additional load presented by the extra wiring required to bypass the slots in PCI local bus B 58. It should be understood that in order to meet the ten load requirement that at any one time only one set of switches may be closed on PCI local bus A 56. Therefore, the opening and closing of switches SW-A1 78 and SW-A2 80 effectively isolate the PCI local bus A 56 from the local effects of the segments and the three added peripheral component slots behind the open switches allows six slots to be utilized on PCI local bus A 56. Although not shown, it should be understood that PCI local bus A 56 without PCI local bus B 58 could also support eight device slots. Additionally, a single pull double throw switch may also replace the two sets of in-line electronic switches. With this configuration, fourteen peripheral component slots are supported by each PCI host bridge.

Referring once again to FIG. 3, The PCI host bridge 76 includes bus control logic 94 having an address decode 100, range registers 101 and an arbiter control 102 for controlling the sequence of turning "on" an "off" the switches SW-A1 78, SW-A2 80, SW-B1 86 and SW-B2 88, respectively, during bus operation. As mentioned before, when using either PCI local bus A 56 or bus B 58, only one set of switches, SW-A1 78 and SW-A2 80 or SW-B1 86 and SW-B2 88 are closed at a time, depending on where a master and where a target is during bus operation on either bus A 56 or bus B 58.

By way of example, but not of limitation, the bus control logic 94 for bus A 56 will be described. The arbiter 102 for bus A 56 determines where the winning master is on the bus 56. If the current controlling master is say on bus segment A1 82, then the switch SW-A1 78 is closed and switch SW-A2 80 is open when that master gains control of bus segment A1. If the operation is DMA (Direct Memory Access) to system memory 50 through the system bus 20, then the target is the host bridge 76. If the next winning arbiter is on segment A2 84, the grant line (GNT#) is removed from the master on segment A1 82, and when its latency timer expires, it gets off the bus 56 resulting in a idle cycle on the bus 56. When the bus 56 goes idle, switch SW-A1 78 is open, and SW-A2 80 is closed, and the GNT# is activated to the winning master waiting on segment A2 84. When the winning master in segment A2 84 sees its GNT# line active on the bus 56 it begins its Direct Memory Access (DMA) to system memory 50 through the system bus 20 operation. It should be noted that the request line (REQ#) and GNT# lines (not shown) are not bused, and therefore not switched by the in-line switches SW-A1 78 and SW-A2 80. Although not described, it should be recognized that the equivalent bus control logic 94 discussed above is also provided for the in-line electronic switches SW-B1 86 and SW-B2 88 inserted along PCI local bus B 58.

Continuing from above and referring once again to FIG. 3, if the winning arbiter 102 is the PCI host bridge 76 for PCI local bus A 56, the address decode 100 and address range registers 101 in the bus controller 94 (for bus A) located in the PCI host bridge 76 is used to find the target the PCI host bridge 76 wants to access. This address decode 100 and address range registers 101 functions are handled in parallel with the arbitration 102 described above. Once a target is located, then the PCI host bridge 76 will know which set of in-line switches SW-A1 78 and SW-A2 80 need to be closed to connect the PCI host bridge 76 to the correct target. If the next target is on the same bus segment as the current controlling master, the switch states will not change until bus control is granted to the next controlling master. The address decode 100 is done to locate the target when the PCI host bridge 76 arbitrates for the PCI local bus A 56, in case the bridge wins the arbitration. When the current controlling master is on segment A1 82, the winning arbiter 102 is the PCI host bridge 76, and the target is on segment A2 84, the GNT# is removed from the master on segment A1 82, and when its latency timer expires, it gets off the PCI local bus 56 resulting in an idle cycle on the PCI local bus 56. When the PCI local bus 56 goes idle, switch SW-A1 78 is open and switch SW-A2 80 is closed and the PCI host bridge 76 now begins its access to the target on PCI local bus segment A2 84. Although not described, it should be recognized that the equivalent bus control logic 94 discussed above is also provided for the set of in-line electronic switches SW-B1 86 and SW-B2 88 inserted along PCI local bus B 58.

Turning once again to FIG. 3, for local bus segments A1 82 and A2 84 there are attached pull-up resistors 104 and 110 located on the slot 96 and 98 sides of the switches 78 and 80. Similarly, for local bus segments B1 90 and B2 92 there are attached pull-up resistors 106 and 108 located on the slot 112 and 114 sides of the switches 86 and 88. Additionally, more than two bus segments per PCI bus may be separated by set of in-line switches as long as the total bus loading requirements and timing budgets are met for a given frequency of operation.

While the invention has been particularly shown and described with reference to a preferred embodiment, it will be understood by those skilled in the art that various changes in form and detail may be made therein without departing from the spirit and scope of the invention.

What is claimed is:

1. A computer system having Peripheral Component Interconnect (PCI) buses comprising:
    a system bus connected to a processor and a system memory;
    a plurality of PCI local buses connected to said system bus via a PCI host bridge;
    at least one set of in-line electronic switches connected along said plurality of PCI local buses; and
    a plurality of PCI peripheral component slots connected to said plurality of PCI local buses, wherein at least one said PCI peripheral component slot shares data with said processor and said system memory by opening and closing said sets of in-line electronic switches.

2. A computer system having Peripheral Component Interconnect (PCI) buses according to claim 1, wherein said plurality of PCI local buses defining a first PCI local bus includes first and second sets of in-line electronic switches, said first set of in-line electronic switches defining a first PCI local bus segment and said second set of in-line electronic switches defining a second PCI local bus segment.

3. A computer system having Peripheral Component Interconnect (PCI) buses according to claim 2, wherein said first PCI local bus segment when operating up to 33 MHz includes up to four PCI peripheral component slots and said second PCI local bus segment when operating up to 33 MHz includes up to four PCI peripheral component slots wherein when one said set of in-line electronic switches are closed the other said set of in-line electronic switches are open.

4. A computer system having Peripheral Component Interconnect (PCI) buses according to claim 3, wherein said PCI host bridge includes bus control logic, said bus control logic including address decode, range registers and arbiter control for determining when said first and said second sets of in-line switches are open and closed depending on where a master and a target is on said first and said second PCI local bus segments.

5. A computer system having Peripheral Component Interconnect (PCI) buses according to claim 2, wherein said first PCI local bus segment when operating up to 33 MHz includes up to three PCI peripheral component slots and said second PCI local bus segment when operating up to 33 MHz includes up to three PCI peripheral component slots wherein when one set of in-line electronic switches are closed the other said set of in-line electronic switches are open.

6. A computer system having Peripheral Component Interconnect (PCI) buses according to claim 5, wherein said second PCI local bus includes third and fourth sets of in-line electronic switches, said third set of in-line electronic switches defining a third PCI local bus segment and said fourth set of in-line electronic switches defining a fourth PCI local bus segment.

7. A computer system having Peripheral Component Interconnect (PCI) buses according to claim 6, wherein said third PCI local bus segment when operating up to 33 MHz includes up to four PCI peripheral component slots and said fourth PCI local bus segment when operating up to 33 MHz includes up to four PCI peripheral component slots wherein when one said set of in-line electronic switches are closed the other said set of in-line electronic switches are open.

8. A computer system having Peripheral Component Interconnect (PCI) buses according to claim 7, wherein said PCI host bridge includes bus control logic, said bus control logic including address decode, range registers and arbiter control for determining when said first, second, third and fourth sets of in-line electronic switches are open and closed depending on where a master and a target is on said first second, third and fourth PCI local bus segments wherein only three said PCI peripheral component slots from said first local bus and four said PCI peripheral component slots from said second local bus are electrically connected to a PCI bus at any given time.

9. A computer system having Peripheral Component Interconnect (PCI) buses according to claim 8, wherein said first, second, third and fourth PCI local bus segments include pull-up resistors.

10. A computer system having Peripheral Component Interconnect (PCI) buses according to claim 1, wherein said first PCI local bus and said second PCI local bus include a plurality of sets of in-line electronic switches, said plurality of sets of in-line electronic switches defining a plurality of PCI local bus segments.

11. A method for supporting multiple Peripheral Component Interconnect (PCI) host bridges within a data-processing system, said method comprising the steps of:

connecting a processor and a system memory to a system bus;

connecting a plurality of PCI local buses to said system bus via a PCI host bridge;

connecting more than one set of in-line electronic switches along said plurality of PCI local bus; and connecting at least one PCI peripheral component slot to said plurality of PCI local buses, wherein at least one said PCI peripheral component slot shares data with said processor and said system memory by opening and closing said sets of in-line electronic switches.

12. A method for supporting multiple Peripheral Component Interconnect (PCI) host bridges within a data-processing system according to claim 11, said method further includes the step of inserting first and second sets of in-line electronic switches along a first PCI local bus defined by said plurality of PCI local buses, said first set of in-line electronic switches defining a first PCI local bus segment and said second set of in-line electronic switches defining a second PCI local bus segment.

13. A method for supporting multiple Peripheral Component Interconnect (PCI) host bridges within a data-processing system according to claim 12, said method further includes the step of attaching up to four PCI peripheral component slots to said first PCI local bus segment and attaching up to four PCI peripheral component slots to said second PCI local bus segment when said data-processing system is operating up to 33 MHz wherein when one said set of in-line electronic switches are closed the other said set of in-line electronic switches are open.

14. A method for supporting multiple Peripheral Component Interconnect (PCI) host bridges within a data-processing system according to claim 13, said method further includes the step of opening and closing said first and said second sets of in-line electronic switches in accordance with bus control logic within said PCI host bridge, said bus control logic including address decode, range registers and arbiter control for determining where a master and a target is on said first and said second PCI local bus segments wherein only four said PCI devices are electrically connected to said PCI bus at a given time when said system is operating up to 33 MHz.

15. A method for supporting multiple Peripheral Component Interconnect (PCI) host bridges within a data-processing system according to claim 12, said method further includes the step of attaching up to three PCI peripheral component slots to said first PCI local bus segment and attaching up to three PCI peripheral component slots to said second PCI local bus segment wherein when one said set of in-line electronic switches are closed the other said set of in-line electronic switches are open.

16. A method for supporting multiple Peripheral Component Interconnect (PCI) host bridges within a data-processing system according to claim 15, said method further includes the step of connecting a second PCI local bus to said system via said PCI host bridge and inserting third and fourth sets of in-line electronic switches along said second PCI local bus, said third set of in-line electronic switches defining a third PCI local bus segment and said fourth set of in-line electronic switches defining a fourth PCI local bus segment.

17. A method for supporting multiple Peripheral Component Interconnect (PCI) host bridges within a data-processing system according to claim 16, said method further includes the step of attaching up to four PCI peripheral component slots to said third PCI local bus segment and attaching up to four PCI peripheral component slots to said fourth PCI local bus segment wherein when one said set of in-line electronic switches are closed the other said set of in-line electronic switches are open.

18. A method for supporting multiple Peripheral Component Interconnect (PCI) host bridges within a data-processing system according to claim 17, said method further includes the step of opening and closing said first, second, third and fourth sets of in-line electronic switches in accordance with bus control logic within said PCI host bridge, said bus control logic including address decode, range registers and arbiter control for determining when said first, second, third and fourth sets of in-line electronic switches are open and closed depending on where a master and a target is on said first second, third and fourth PCI local bus segments wherein only three said PCI peripheral component slots from said first local bus and four said PCI peripheral component slots from said second local bus are electrically connected to a PCI bus at a given time.

19. A method for supporting multiple Peripheral Component Interconnect (PCI) host bridges within a data-processing system according to claim 18, said method further includes the step of inserting pull-up resistors along said first, second, third and fourth PCI local bus segments.

20. A computer system having Peripheral Component Interconnect (PCI) buses comprising:

a system bus connected to a processor and a system memory;

a first PCI local bus connected to said system bus via a PCI host bridge, said first PCI local bus includes first and second sets of in-line electronic switches, said first set of in-line electronic switches defining a first PCI local bus segment and said second in-line electronic switch defining a second PCI local bus segment, said first PCI local bus segment includes three PCI peripheral component slots and said second PCI local bus segment includes three PCI peripheral component slots;

a second PCI local bus connected to said system bus via said PCI host bridge, said second PCI local bus includes third and fourth sets of in-line electronic switches, said third set of in-line electronic switches defining a third PCI local bus segment and said fourth set of in-line electronic switches defining a fourth PCI local bus segment, said third PCI local bus segment includes four PCI peripheral component slots and said fourth PCI local bus segment includes four PCI peripheral component slots; and said PCI host bridge includes bus control logic, said bus control logic including address decode, range registers and arbiter control for determining when said first, second, third and fourth sets of in-line electronic switches are open and closed depending on where a master and a target is on said first second, third and fourth PCI local bus segments wherein only three said PCI peripheral component slots from said first local bus and four said PCI devices from said second local bus are electrically connected to a PCI bus at a given time when said computer system is operating up to 33 MHz.

* * * * *